UNITED STATES PATENT OFFICE.

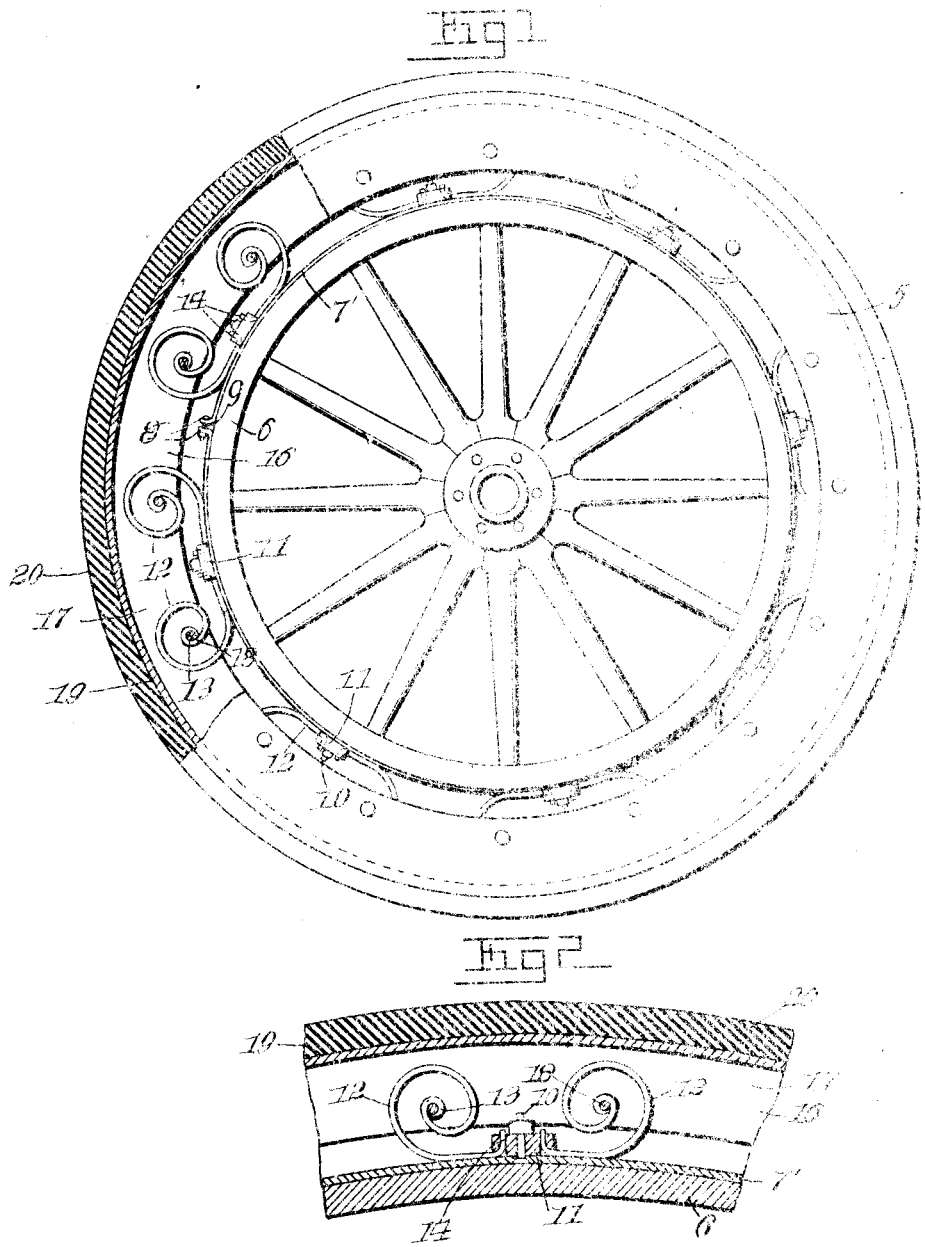

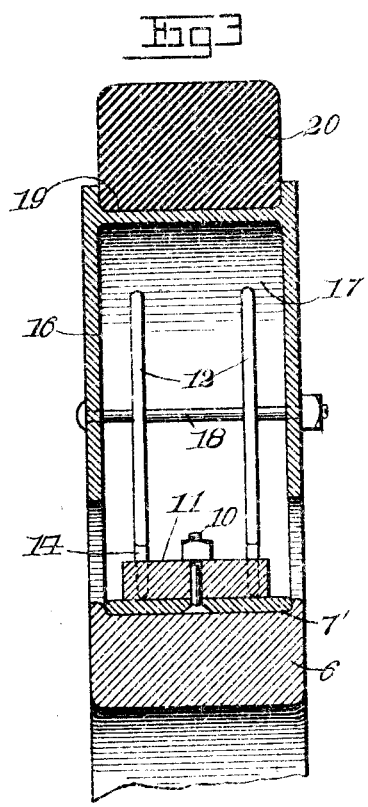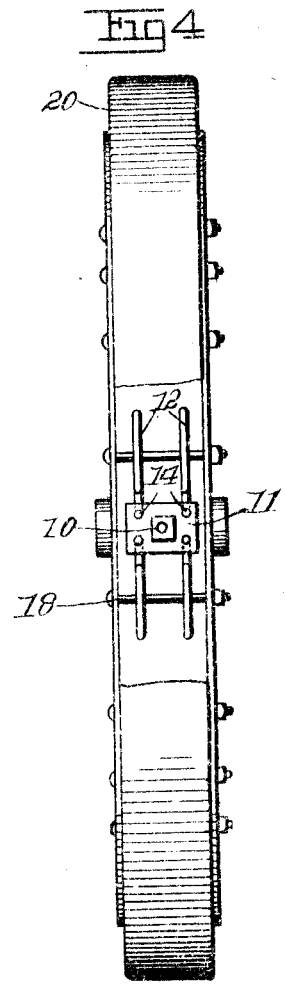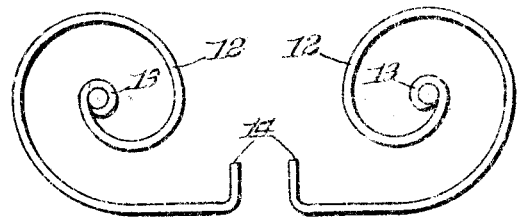

CHARLES P. ROSIER, OF BOULDER, COLORADO.

SPRING-TIRE.

1,035,052.

Specification of Letters Patent.

Patented Aug. 6, 1912.

Application filed July 22, 1911. Serial No. 639,906.

*To all whom it may concern:*

Be it known that I, CHARLES P. ROSIER, a citizen of the United States, residing at Boulder, in the county of Boulder and State of Colorado, have invented new and useful Improvements in Spring-Tires, of which the following is a specification.

The invention relates to tires, and more particularly to the class of spring tires for vehicles.

The primary object of the invention is the provision of a tire in which the same may be conveniently and readily mounted upon the felly of a vehicle wheel, and that will possess the requisite amount of resiliency and durability.

Another object of the invention is the provision of a tire in which the body portion thereof is supported upon resilient members which permit the yielding of the body, so as to absorb shocks and jars incident to the travel of a vehicle wheel, and that will obviate the puncturing of the tire, thereby increasing the life of the same.

A further object of the invention is the provision of a tire in which the body thereof is formed from metal, the same being provided with a resilient tread, either of rubber or leather, the body being supported upon a plurality of springs, and sustained spaced from the felly, so as to possess the requisite resiliency, when in service.

A still further object of the invention is the provision of a tire which is simple in construction, strong, possessing the characteristics of an ordinary pneumatic tire, and that is reliable and efficient in operation, and inexpensive in manufacture.

With these and other objects in view, the invention consists in the construction, combination and arrangement of parts, as will be hereinafter more fully described, illustrated in the accompanying drawings, and pointed out in the claim hereunto appended.

In the drawings: Figure 1 is a side elevation of a vehicle wheel, parts being broken away, with the tire thereon constructed in accordance with the invention. Fig. 2 is a fragmentary vertical longitudinal sectional view through a portion of the tire and vehicle wheel. Fig. 3 is an enlarged vertical transverse sectional view. Fig. 4 is a plan view, looking toward the tread of the tire, the same being partly broken away. Fig. 5 is a side elevation of a pair of spring members removed from the tire.

Similar reference characters indicate corresponding parts throughout the several views of the drawings.

Referring to the drawings by numerals, 5 designates generally a vehicle wheel, which is of the ordinary well-known construction, having the usual rim 7, upon which is mounted the tire, presently described.

The spring tire comprises a metallic band 7', the same being adapted to fit upon and surround the felly 6 of the vehicle wheel, and has its ends outturned to form parallel ears 8, the same being provided with suitable alining openings or perforations, through which is passed a bolt member 9, which, when tightened, will securely fasten the band 7' upon the felly of the vehicle wheel. The said felly may be suitably channeled to receive the band, so as to prevent any lateral displacement of the same thereon. At intervals throughout the diameter of the band 7' are formed suitable openings, through which are passed bolt members 10 having the usual heads which are adapted to engage in counter seats formed in the inner face of the band 7', so that the said heads of the bolt members will lie flush with the inner face of said band, when engaged in the openings therein.

Mounted upon the bolt members 10 are transversely disposed clamping plates or blocks 11, in which are engaged the inner ends of oppositely extending spring members 12, the outer ends of which are coiled, as at 13, while the inner ends of the said spring members are upturned, as at 14, to engage in suitable openings formed in the blocks or plates 11, the inner faces of the latter being formed with grooves providing seats 15 for the spring members 12, and upon the tightening of the bolt members 10, the said clamping plates or blocks 11 will securely fasten the spring members thereto.

Supported by the spring members 12 is an annular tire body 16, the same being formed with an annular channel 17, at its inner side, into which project the coiled ends 13 of the spring members, and through these coiled ends are passed transversely disposed bolt members 18, the latter being engaged in opposite side walls of the said tire body 16, thereby connecting the latter to the coiled ends of the spring members.

The tire body 16 is preferably constructed from aluminum, although it may be made from any other suitable metal or material, and has formed in its outer side an annular groove 19, in which is engaged a resilient tread 20, preferably of rubber, although the same may be made from leather or other suitable elastic or resilient material. It will be evident that the tire body 16 will yield when passing over an obstruction or any irregularity in the ground, and can not become punctured or will not burst, thereby increasing the life of the tire. The tire constructed as hereinbefore stated will possess all of the characteristics of an ordinary pneumatic tire, yet will have the advantage of greater durability and strength, with the required elasticity for customary service.

What is claimed is:

A spring tire of the class described comprising a band secured to the felly of a wheel, relatively spaced clamping blocks, bolts passing through said band and blocks to secure the blocks to the outer side of the band, said blocks having a pair of L-shaped openings on each side of said bolt, the openings of each pair being relatively spaced, a pair of relatively spaced springs located on each side of each block, said springs being provided with curved bearing portions resting on the outer side of the band and having their inner ends bent upwardly and engaging in said openings, said springs having outwardly coiled outer ends, and a tire connected with the coiled ends of said springs.

In testimony whereof I affix my signature in presence of two witnesses.

CHARLES P. ROSIER.

Witnesses:
W. L. Cox,
D. K. Wellman.